US012400373B2

(12) United States Patent
Santhar et al.

(10) Patent No.: US 12,400,373 B2
(45) Date of Patent: Aug. 26, 2025

(54) COMPRESSED MEDIA TRANSMISSION AND HIGH QUALITY REGENERATION

(71) Applicant: INTERNATIONAL BUSINESS MACHINES CORPORATION, Armonk, NY (US)

(72) Inventors: Sathya Santhar, Ramapuram (IN); Sridevi Kannan, Chennai (IN); Sarbajit K. Rakshit, Kolkata (IN); Samuel Mathew Jawaharlal, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 81 days.

(21) Appl. No.: 18/500,484

(22) Filed: Nov. 2, 2023

(65) Prior Publication Data
US 2025/0148653 A1    May 8, 2025

(51) Int. Cl.
*G06T 9/00*    (2006.01)
*G06T 3/4046*  (2024.01)

(52) U.S. Cl.
CPC ............ *G06T 9/002* (2013.01); *G06T 3/4046* (2013.01)

(58) Field of Classification Search
None
See application file for complete search history.

(56) References Cited

U.S. PATENT DOCUMENTS

| 7,359,560 | B2 | 4/2008 | Mossakowski |
| 7,656,561 | B2 | 2/2010 | Mølgaard |
| 9,111,345 | B2 | 8/2015 | Sato |
| 10,535,120 | B2 * | 1/2020 | Edwards ............... G06V 10/95 |

FOREIGN PATENT DOCUMENTS

| CA | 2289384 C | 3/2003 |
| WO | 2021134872 A1 | 7/2021 |

OTHER PUBLICATIONS

Myakal et al., "Pixel Value Prediction Task: Performance Comparison of Multi-Layer Perceptron and Radial Basis Function Neural Network", Conference paper, Jun. 24, 2023, pp. 543-553.

(Continued)

*Primary Examiner* — Tyler W. Sullivan
(74) *Attorney, Agent, or Firm* — Robert R. Aragona

(57) ABSTRACT

An embodiment for transmitting and regenerating compressed media is provided. The embodiment may include receiving an image selected by a sender to be transmitted. The embodiment may also include sending the image to a pre-trained generative adversarial network (GAN) model. The embodiment may further include identifying a first set of one or more pixels in the image assigned to one or more high priority Class of Service (CoS) groups and a second set of one or more pixels in the image assigned to one or more low priority CoS groups. The embodiment may also include compressing the one or more pixels in the second set. The embodiment may further include transmitting the one or more pixels in the first set and the compressed one or more pixels in the second set to a recipient in an order from a highest priority CoS group to a lowest priority CoS group.

20 Claims, 6 Drawing Sheets

(56) References Cited

OTHER PUBLICATIONS

Dimond, et al., "Methodology for Designing and Implementing a Class for Service for the Transmission of Medical Images Over a Common Network", Proc. SPIE 3980, Medical Imaging 2000: PACS Design and Evaluation: Engineering and Clinical Issues, May 18, 2000, 15 pgs.
Guo, et al., "Super-Resolution Image Reconstruction Based on Self-Calibrated Convolutional GAN", arXiv:2106.05545v1 [eess.IV], Jun. 10, 2021, 8 pgs.
Isola, et al., "Image-to-Image Translation with Conditional Adversarial Networks", arXiv:1611.07004v3 [cs.CV], Nov. 26, 2018, 17 pgs.
Iwai, et al., "Fidelity-Controllable Extreme Image Compression with Generative Adversarial Networks", arXiv:2008.10314v1 [eess.IV], Aug. 24, 2020, 8 pgs.
Karras, et al., "Progressive Growing of GANs for Improved Quality, Stability, and Variation", arXiv:1710.10196v3 [cs. NE], Feb. 26, 2018, 26 pgs.
Ledig, et al., "Photo-Realistic Single Image Super-Resolution Using a Generative Adversarial Network", arXiv:1609.04802v5 [cs.CV], May 25, 2017, 19 pgs.
Prabhakaran, et al., "Image Pixel Prediction from Neighborhood Pixels Using Multilayer Perceptron", In Bansal, J., Das, K., Nagar, A., Deep, K., Ojha, A. (eds) Soft Computing for Problem Solving. Advances in Intelligent Systems and Computing, vol. 817. Springer, Singapore, 2019, pp. 221-230.

\* cited by examiner

COMPRESSED MEDIA TRANSMISSION AND HIGH QUALITY REGENERATION

BACKGROUND

The present invention relates generally to the field of computing, and more particularly to a system for transmitting and regenerating compressed media.

Photographs and other images in digital form are made up of pixels. Pixels are the smallest unit of information that make up a picture. These pixels may be round or square and are typically arranged in a two-dimensional grid. The number of pixels in a digital image is sometimes referred to as the resolution. For example, a monitor resolution may be expressed as 1280×1024. Additionally, generative adversarial networks (GANs) are a recent innovation in machine learning (ML). GANs are a way of training a generative model by framing a problem as a supervised learning problem with two sub-models: a generator model that generates new examples; and a discriminator model that attempts to classify the examples as real or fake.

SUMMARY

According to one embodiment, a method, computer system, and computer program product for transmitting and regenerating compressed media is provided. The embodiment may include receiving an image selected by a sender to be transmitted to a recipient. The embodiment may also include sending the image to a pre-trained generative adversarial network (GAN) model. The embodiment may further include identifying a first set of one or more pixels in the image assigned to one or more high priority Class of Service (CoS) groups and a second set of one or more pixels in the image assigned to one or more low priority CoS groups based on a pre-defined grouping of the one or more pixels in the first set and the one or more pixels in the second set. The embodiment may also include compressing, by the pre-trained GAN model, the one or more pixels in the second set. The embodiment may further include transmitting the one or more pixels in the first set and the compressed one or more pixels in the second set to the recipient in an order from a highest priority CoS group to a lowest priority CoS group.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
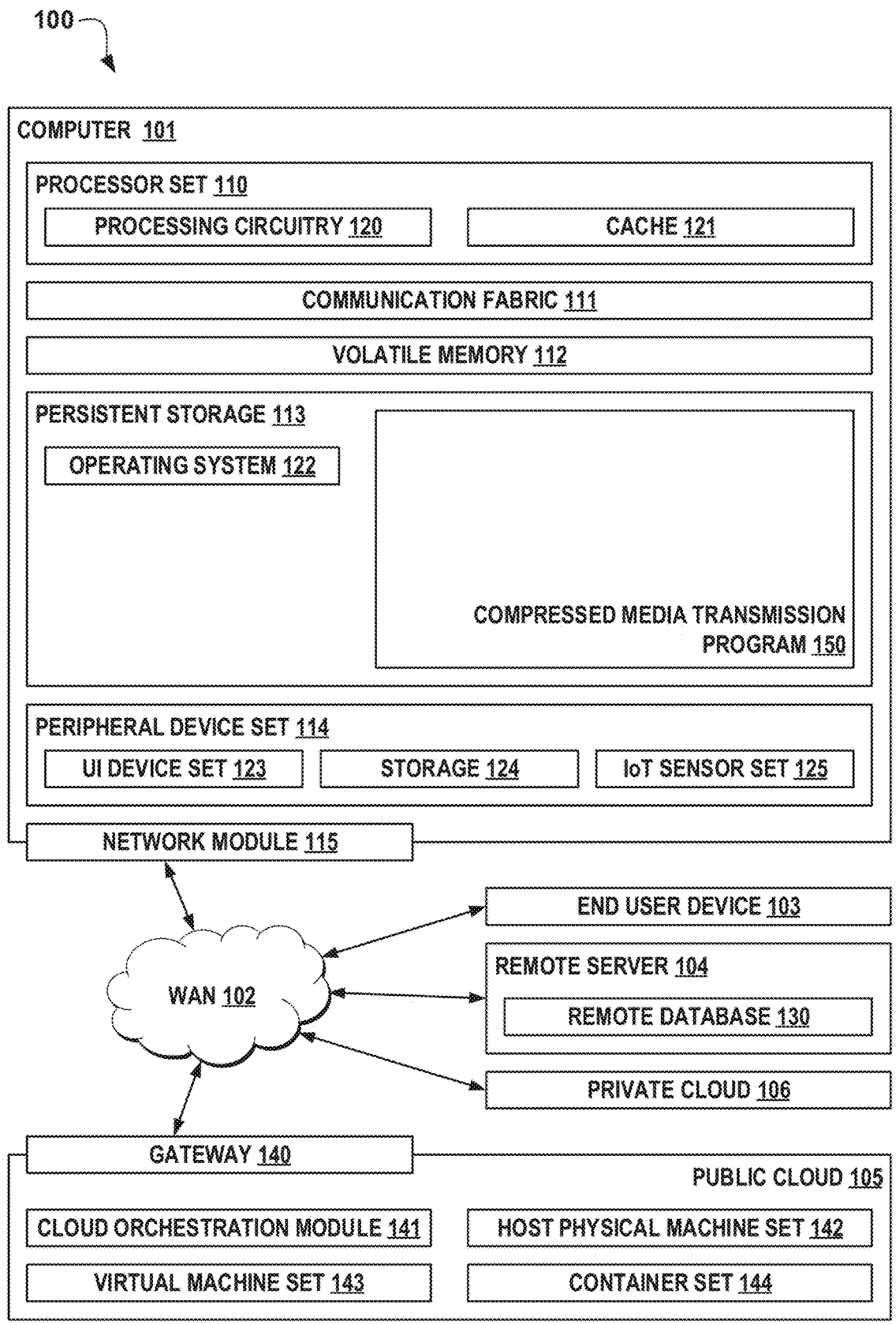
FIG. 1 illustrates an exemplary computing environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for transmitting and regenerating compressed media. The following described exemplary embodiments provide a system, method, and program product to, among other things, send an image to a pre-trained generative adversarial network (GAN) model and, accordingly, transmit one or more pixels in a first set and compressed one or more pixels in a second set to a recipient in an order from a highest priority Class of Service (CoS) group to a lowest priority CoS group. Therefore, the present embodiment has the capacity to improve media compression and regeneration technology by prioritizing pixels based on CoS groups.

As previously described, photographs and other images in digital form are made up of pixels. Pixels are the smallest unit of information that make up a picture. These pixels may be round or square and are typically arranged in a two-dimensional grid. The number of pixels in a digital image is sometimes referred to as the resolution. For example, a monitor resolution may be expressed as 1280×1024. Additionally, generative adversarial networks (GANs) are a recent innovation in machine learning (ML). GANs are a way of training a generative model by framing a problem as a supervised learning problem with two sub-models: a generator model that generates new examples; and a discriminator model that attempts to classify the examples as real or fake. Given a large media file that is to be transmitted from a sender to a recipient over a network, it takes a considerable amount of time for upload by the sender and download by the recipient. This problem is typically addressed by randomly compressing pixels to reduce a size of the large media file. However, randomly compressing pixels produces a resultant image that fails to match the fidelity of the original image.

It may therefore be imperative to have a system in place to transmit image pixels based on a CoS of the image pixels. According to at least one embodiment, a computer-based method, computer system, and computer program product for altering operational parameters of a machine in a multimachine environment is provided. The method comprises receiving an image selected by a sender to be transmitted to a recipient, sending the image to a pre-trained GAN model, identifying a first set of one or more pixels in the image assigned to one or more high priority CoS groups and a second set of one or more pixels in the image assigned to one or more low priority CoS groups based on a pre-defined grouping of the one or more pixels in the first set and the one or more pixels in the second set, compressing, by the pre-trained GAN model, the one or more pixels in the second set, and transmitting the one or more pixels in the first set and the compressed one or more pixels in the second set to the recipient in an order from a highest priority CoS group to a lowest priority CoS group. This embodiment has the advantage of increasing the transmission rate of higher priority pixels.

According to at least one embodiment, the method may further comprise regenerating the image at a receiving end of the recipient by reconstructing the compressed one or more pixels in the second set. This embodiment has the advantage of maintaining the quality of an original image that is regenerated at the receiving end.

According to at least one embodiment, the method may further comprise a training phase, where the training phase comprises receiving an image having a window from a knowledge corpus, masking a pixel in the window of the image, sliding a kernel of a pre-defined size over at least a portion of the window including the masked pixel in a forward direction, generating, by a GAN generator, a predicted pixel for the masked pixel based on one or more surrounding pixels, determining whether a discriminator of the GAN is able to identify the predicted pixel as real, in response to determining the discriminator is able to identify the predicted pixel as real, generating a reconstruction quality score for the pixel based on a similarity between the pixel and the predicted pixel, and assigning a CoS priority level to the pixel based on the reconstruction quality score in accordance with a CoS priority table. This embodiment has the advantage of pre-training a GAN on pixel prediction prior to a real-world implementation.

According to at least one embodiment, the training phase may further comprise iterating, for each additional pixel in the window, masking the additional pixel in the window of the image, sliding the kernel of the pre-defined size over at least an additional portion of the window including the additional masked pixel in the forward direction, generating, by the GAN generator, an additional predicted pixel for the additional masked pixel based on one or more additional surrounding pixels, determining whether the discriminator of the GAN is able to identify the additional predicted pixel as real, in response to determining the discriminator is able to identify the additional predicted pixel as real, generating an additional reconstruction quality score for the additional pixel based on a similarity between the additional pixel and the additional predicted pixel, assigning an additional CoS priority level to the additional pixel based on the additional reconstruction quality score in accordance with the CoS priority table, and assigning the pixel and each additional pixel to one or more CoS priority groups based on the CoS priority level and the additional CoS priority level. This embodiment has the advantage of pre-training the GAN on multiple pixels prior to the real-world implementation.

According to at least one embodiment, the one or more pixels in the first set may be transmitted before the compressed one or more pixels in the second set. This embodiment has the advantage of optimizing the pixel transmission process.

According to at least one embodiment, the one or more pixels in the first set may have a lower reconstruction quality score than the compressed one or more pixels in the second set. This embodiment has the advantage of organizing and prioritizing pixels based on a CoS.

According to at least one embodiment, the reconstruction quality score of the compressed one or more pixels in the second set may be between 41% and 100%. This embodiment has the advantage of re-creating an original pixel with minimal loss.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to send an image to a pre-trained GAN model and, accordingly, transmit one or more pixels in a first set and compressed one or more pixels in a second set to a recipient in an order from a highest priority CoS group to a lowest priority CoS group.

Referring to FIG. 1, an exemplary computing environment 100 is depicted, according to at least one embodiment. Computing environment 100 contains an example of an environment for the execution of at least some of the computer code involved in performing the inventive methods, such as a compressed media transmission program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the compressed media transmission program 150 may be a program capable of receiving an image selected by a sender to be transmitted to a recipient, sending the image to a pre-trained GAN model, and transmitting one or more pixels in a first set and compressed one or more pixels in a second set to the recipient in an order from a highest priority CoS group to a lowest priority CoS group. Furthermore, notwithstanding depiction in computer 101, the compressed media transmission program 150 may be stored in and/or executed by, individually or in any combination, end user device 103, remote server 104, public cloud 105, and private cloud 106. The compressed media transmission method is explained in further detail below with respect to FIGS. 2, 3A, and 3B. It may be appreciated that the examples described below are not intended to be limiting, and that in embodiments of the present invention the parameters used in the examples may be different.

Figure 2:
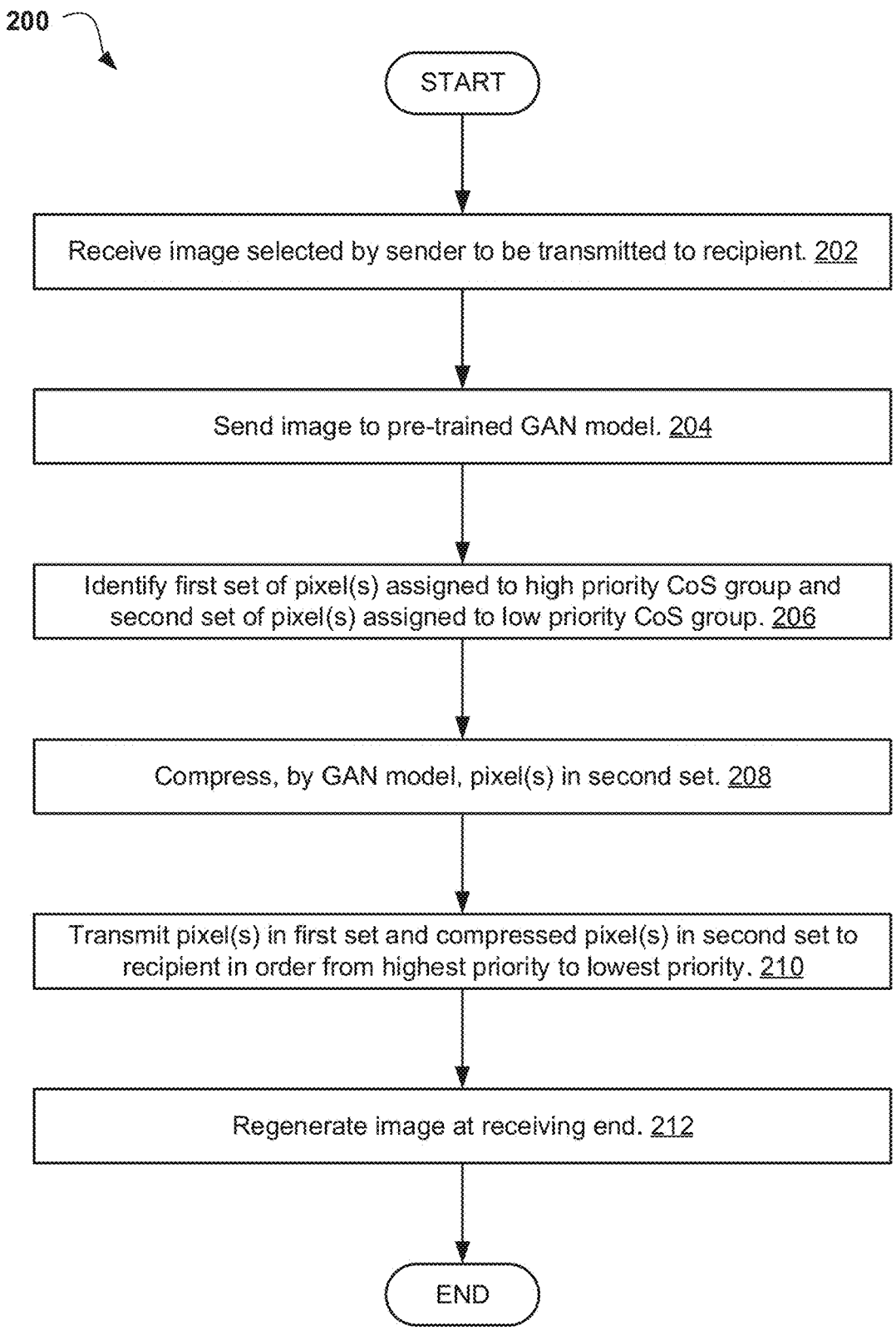
FIG. 2 illustrates an operational flowchart for transmitting and regenerating compressed media in a compressed media transmission process according to at least one embodiment.

Referring now to FIG. 2, an operational flowchart for transmitting and regenerating compressed media in a compressed media transmission process 200 is depicted according to at least one embodiment. At 202, the compressed media transmission program 150 receives the image selected by the sender to be transmitted to the recipient. The image may be stored in a knowledge corpus, such as remote database 130. The image obtained from the knowledge corpus may be a pre-processed image, described in further detail below with respect to the description of FIGS. 3A and 3B. Additionally, the image selected by the sender may have to undergo compression in order to be transmitted from the sender to the recipient.

Then, at 204, the compressed media transmission program 150 sends the image to a pre-trained GAN model. The GAN model may be trained on pixel prediction during the training phase prior to a real-world implementation, described in further detail below with respect to the description of FIGS. 3A and 3B. The pre-trained GAN model may include a generator model and a discriminator model. The generator model may be trained to generate new examples, and the discriminator model attempts to classify examples as real (e.g., from the domain) or fake (e.g., generated). The two models may be trained together in a zero-sum game (i.e., adversarial), until the discriminator model is fooled about half the time.

Next, at 206, the compressed media transmission program 150 identifies the first set of one or more pixels in the image assigned to the one or more high priority CoS groups and the second set of one or more pixels in the image assigned to the one or more low priority CoS groups. The identification is based on the pre-defined grouping of the one or more pixels in the first set and the one or more pixels in the second set. As used herein, a "high priority CoS group" means a CoS group that is assigned a value of CoS 1 or CoS 2. As used herein, a "low priority CoS group" means a CoS group that is assigned a value of CoS 3, CoS 4, or CoS 5.

Each of the CoS groups may include one or more pixels. Each pixel may be assigned a CoS priority level during the training phase, described in further detail below with respect to the description of FIGS. 3A and 3B. The CoS priority level assigned to each pixel may be based on the reconstruction quality score of each pixel in accordance with the CoS priority table. Additional details on the reconstruction quality score are also described in further detail below with respect to the description of FIGS. 3A and 3B. The CoS priority table may be as follows:

| Score | CoS Value |
|---|---|
| 0-20% | CoS 1 |
| 21-40% | CoS 2 |
| 41-60% | CoS 3 |
| 61-80% | CoS 4 |
| 81-100% | CoS 5 |

As shown in the table above, the reconstruction quality score is inversely proportional to the CoS value (i.e., a lower reconstruction quality score may be assigned a higher (i.e., in terms of CoS priority) CoS value).

For example, where there are five pixels in the image, pixel 1 may have a reconstruction quality score of 90%, pixel 2 may have a reconstruction quality score of 81%, pixel 3 may have a reconstruction quality score of 50%, pixel 4 may have a reconstruction quality score of 20%, and pixel 5 may have a reconstruction quality score of 15%. Continuing the example, and based on the table above, pixel 1 may be assigned priority level CoS 5, pixel 2 may be assigned priority level CoS 5, pixel 3 may be assigned priority level CoS 3, pixel 4 may be assigned priority level CoS 1, and pixel 5 may be assigned priority level CoS 1. Thus, in this example, the one or more pixels in the first set may be pixel 4 and pixel 5, and the one or more pixels in the second set may be pixel 1, pixel 2, and pixel 3.

Then, at 208, the compressed media transmission program 150 compresses the one or more pixels in the second set. The one or more pixels in the second set are compressed by the pre-trained GAN model. The one or more pixels in the first set may have a lower reconstruction quality score than the compressed one or more pixels in the second set. The reconstruction quality score of the compressed one or more pixels in the second set may be between 41% and 100%, as shown in the table above. For example, where pixel 1 has a reconstruction quality score of 90%, pixel 2 has a reconstruction quality score of 81%, and pixel 3 has a reconstruction quality score of 50%, pixel 1, pixel 2, and pixel 3 may be compressed. Since the one or more pixels in the second set have a higher reconstruction quality score compared with the one or more pixels in the first set, the one or more pixels in the second set may have an increased probability of being reconstructed by the GAN at the receiving end with the same quality.

According to at least one embodiment, the one or more pixels in the first set may remain uncompressed. Since the one or more pixels in the first set have a lower reconstruction quality score compared with the one or more pixels in the second set, the one or more pixels in the first set may have a lower probability of being reconstructed by the GAN at the receiving end with the same quality. Thus, it may be desirable to leave the one or more pixels in the first set uncompressed.

Next, at 210, the compressed media transmission program 150 transmits the one or more pixels in the first set and the compressed one or more pixels in the second set to the recipient in the order from the highest priority CoS group to the lowest priority CoS group. The order may be as follows: CoS 1 first, CoS 2 second, CoS 3 third, CoS 4 fourth, and CoS 5 fifth. The one or more pixels in the first set may be transmitted before the compressed one or more pixels in the second set. In this manner, the uncompressed pixels in the first set with the lower reconstruction quality score may be transmitted with minimal loss.

For example, where pixel 1 is assigned priority level CoS 5, pixel 2 is assigned priority level CoS 5, pixel 3 is assigned priority level CoS 3, pixel 4 is assigned priority level CoS 1, and pixel 5 is assigned priority level CoS 1; pixel 1 and pixel 2 may be in group CoS 5, pixel 3 may be in group CoS 3, and pixel 4 and pixel 5 may be in group CoS 1. Continuing the example, pixel 4 and pixel 5 may be transmitted first, pixel 3 may be transmitted second, and pixel 1 and pixel 2 may be transmitted third. Thus, in this example, pixel 4 and pixel 5 may remain uncompressed; and pixel 1, pixel 2, and pixel 3 may be compressed.

Then, at 212, the compressed media transmission program 150 regenerates the image at the receiving end of the recipient by reconstructing the compressed one or more pixels in the second set. The relative positions of the one or more pixels in the first set and the compressed one or more pixels in the second set may be tagged during the training phase, described in further detail below with respect to the description of FIGS. 3A and 3B.

According to at least one embodiment, the regeneration may include arranging the one or more pixels in the first set based on the tagged positions of the one or more pixels in the first set. Since the one or more pixels in the first set may be transmitted before the compressed one or more pixels in the second set, the pre-trained GAN may utilize the one or more pixels in the first set to reconstruct the compressed one or more pixels in the second set. The compressed one or more pixels in the second set may be reconstructed in a reverse process (e.g., from right to left and bottom to top) based on the tagged positions of the compressed one or more pixels in the second set. In this manner, an original image selected by the sender and transmitted to the recipient may be regenerated at the receiving end with the same quality as the original image.

Figure 3A:
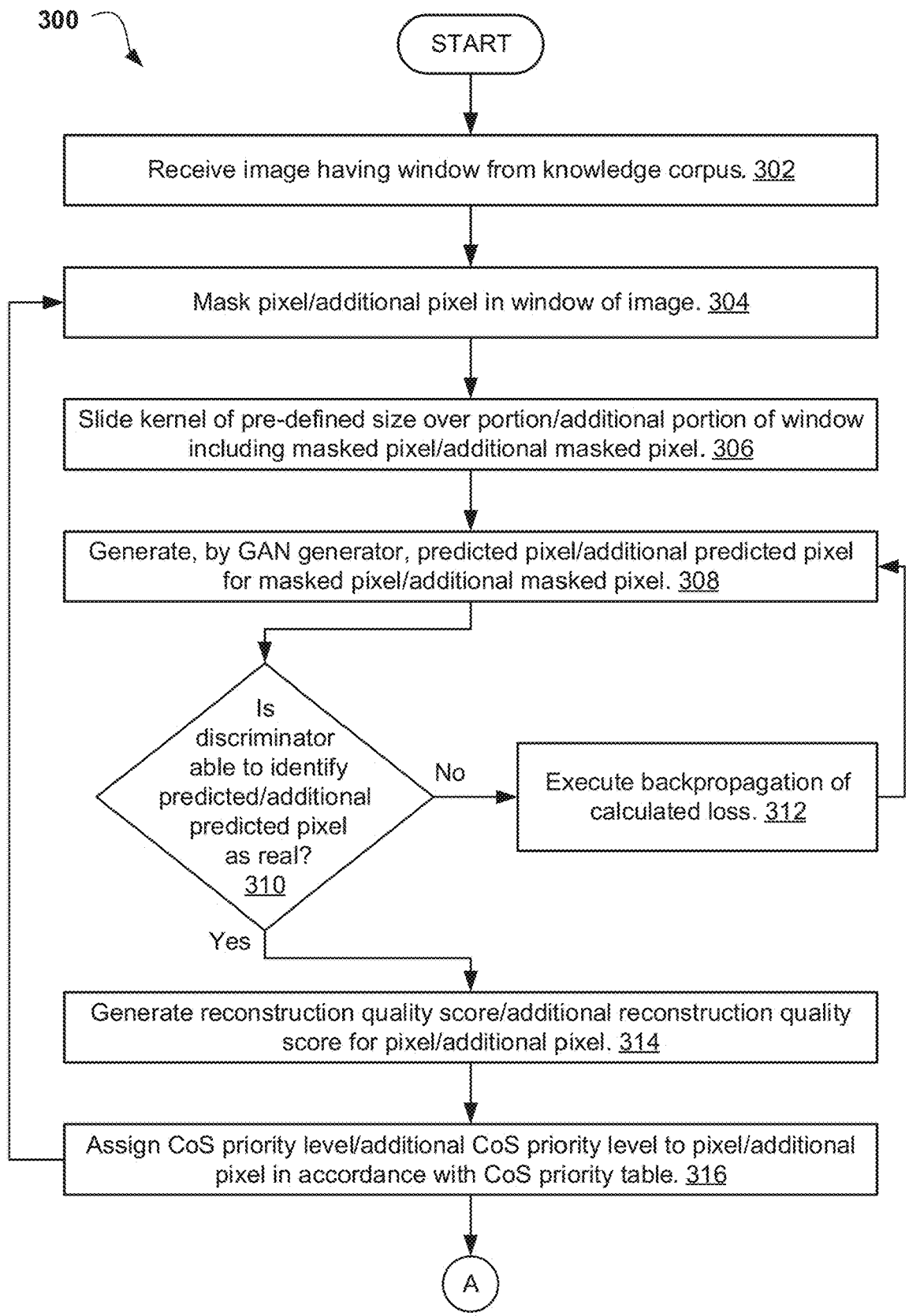
FIGS. 3A and 3B illustrate an operational flowchart of a training phase in the compressed media transmission process of FIG. 2 according to at least one embodiment.
Figure 3B:
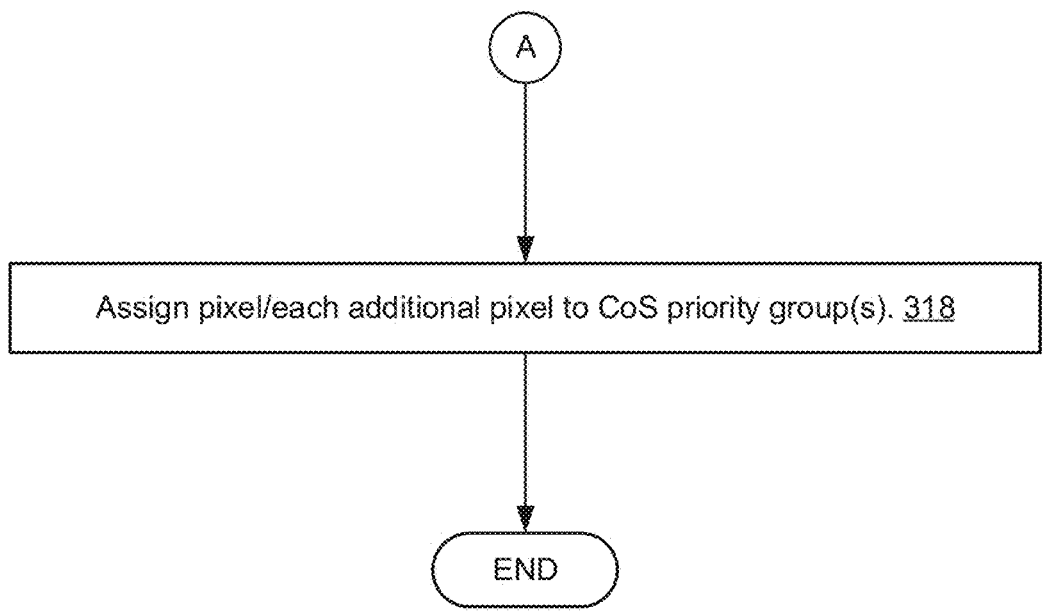

Referring now to FIGS. 3A and 3B, an operational flowchart of a training phase in the compressed media transmission process 300 of FIG. 2 is depicted according to at least one embodiment. At 302, the compressed media transmission program 150 receives the image having the window from the knowledge corpus. The knowledge corpus may include a variety of images that may be utilized to train the GAN. The window of the image may be defined by four sides, and the image may be in portrait or landscape orientation. For example, the image may be a picture of an array of fruits and vegetables.

Then, at 304, the compressed media transmission program 150 masks the pixel in the window of the image. The pixel may be masked by hiding the pixel. For example, a black box may be placed in the window of the image over the pixel. It may be appreciated that in embodiments of the present invention, only one pixel may be hidden at a time in an iterative process, described in further detail below with respect to step 316. For example, the pixel in a top-left corner of the window may be hidden during a first iteration, an adjacent pixel to the pixel in the top-left corner may be hidden during a second iteration, and so on.

Next, at 306, the compressed media transmission program 150 slides the kernel of the pre-defined size over at least the portion of the window including the masked pixel in the forward direction. The pre-defined size may be of N*N. For example, the pre-defined size may be 3*3. According to at least one embodiment, the stride value of the kernel may also be defined. For example, the stride value may be set to one. In this manner, one or more pixels may be skipped or included during the sliding process. The forward direction may be from left to right and top to bottom.

According to at least one embodiment, the kernel may be slid over the entire window. For example, where the pre-defined size of the kernel is 3*3, and the size of the window in terms of pixels is also 3*3, the kernel may be slid over the entire window.

According to at least one other embodiment, the kernel may be slid over a fraction (i.e., a portion) of the window. For example, where the pre-defined size of the kernel is 3*3, and the size of the window in terms of pixels is 6*6, the kernel may be slid over the fraction of the window. In either embodiment, the kernel of the pre-defined size may be slid over the masked pixel. For example, where the masked pixel is in the top left corner of the window, the kernel may be slid over the top portion of the window.

Then, at 308, the compressed media transmission program 150 generates the predicted pixel for the masked pixel. The predicted pixel may be generated by the GAN generator based on the one or more surrounding pixels. Depending on where the masked pixel is located, the GAN generator may utilize the one or more surrounding pixels to predict and generate a pixel for the masked pixel. For example, where the masked pixel is in the top left corner of the window, the one or more surrounding pixels may be a pixel located immediately to the right of the masked pixel and a pixel located immediately below the masked pixel. In another example, where the masked pixel is in the bottom right corner of the window, the one or more surrounding pixels may be a pixel located immediately to the left of the masked pixel and a pixel located immediately above the masked pixel. The GAN generator may attempt to generate the predicted pixel to look as real as possible, with the objective of fooling the GAN discriminator into classifying the predicted pixel as real, described in further detail below with respect to step 310.

Next, at 310, the compressed media transmission program 150 determines whether the discriminator of the GAN is able to identify the predicted pixel as real. The output from the GAN generator (i.e., the predicted pixel) is fed as input into the GAN discriminator. In any GAN, as described above with respect to step 308, the goal of the GAN generator is to trick the GAN discriminator into classifying artificially generated (i.e., fake) images as real. The GAN discriminator may then output a number between 0 and 1, where 0 indicates the GAN discriminator classified the predicted pixel as fake and 1 indicates the GAN discriminator classified the predicted pixel as real. For example, where the GAN discriminator receives a predicted pixel containing a portion of a piece of fruit, the GAN discriminator may output a number classifying the predicted pixel as real or fake.

In response to determining the GAN discriminator is able to identify the predicted pixel as real (step 310, "Yes" branch), the compressed media transmission process 300 proceeds to step 314 to generate the reconstruction quality score for the pixel based on the similarity between the pixel and the predicted pixel. In response to determining the GAN discriminator is not able to identify the predicted pixel as real (step 310, "No" branch), the compressed media transmission process 300 proceeds to step 312 to execute the backpropagation of the calculated loss.

Then, at 312, the compressed media transmission program 150 executes the backpropagation of the calculated loss. The backpropagation may involve feeding the calculated loss backward such that weights of the GAN may be adjusted.

For example, the GAN generator may generate a predicted pixel that is classified as fake by the GAN discriminator. Continuing the example, the GAN model may output a value of 4 instead of 1, which may be attributed to the weights not having been fine-tuned. In this example, assuming the loss is equal to −4, this loss may be fed backwards such that that weights of the GAN may be adjusted. In this manner, a smaller loss may be yielded in the next iteration.

It may be appreciated that in embodiments where the GAN discriminator is not able to identify the predicted pixel as real, step 308 may be iterated until the GAN discriminator is able to identify the predicted pixel as real. The GAN generator may apply one or more modifications to the predicted pixel in accordance with the adjusted weights. With each iteration, the GAN generator may improve the accuracy of the predicted pixel by adjusting the weights based on feedback from the GAN discriminator.

Next, at 314, the compressed media transmission program 150 generates the reconstruction quality score for the pixel. The reconstruction quality score may be based on a similarity between the pixel and the predicted pixel. The more similar the predicted pixel is to the original pixel, the higher the reconstruction quality score. The reconstruction quality score may be provided by a regressor model of a two-staged hybrid model including a regressor and a classifier, where the output of the regressor model may be a decimal. The decimal may then be converted into a percentage, as shown in the table above with respect to step 206. For example, the pixel may be assigned a reconstruction quality score of 0.9, which equals 90%.

Then, at 316, the compressed media transmission program 150 assigns the CoS priority level to the pixel. The CoS level may be assigned based on the reconstruction quality score in accordance with the CoS priority table. As shown in the table above with respect to step 206, a pixel having a reconstruction quality score between 0% and 20% may be assigned priority level CoS 1, a pixel having a reconstruction quality score between 21% and 40% may be assigned priority level CoS 2, a pixel having a reconstruction quality score between 41% and 60% may be assigned priority level CoS 3, a pixel having a reconstruction quality score between 61% and 80% may be assigned priority level CoS 4, and a pixel having a reconstruction quality score between 81% and 100% may be assigned priority level CoS 5. For example, where the pixel has a reconstruction quality score of 90%, the pixel may be assigned priority level CoS 5.

It may be appreciated that in embodiments where there are multiple pixels, steps 304, 306, 308, 310, 312, 314, and 316 may be iterated for each additional pixel in the window until there is no additional pixel in the window.

According to at least one embodiment, where there is at least one additional pixel, the compressed media transmission program 150 may mask the additional pixel in the window of the image in the manner described above with respect to step 304. Each additional pixel may be masked in an order from left to right and top to bottom until there is no additional pixel in the window. Then, the compressed media transmission program 150 may slide the kernel of the pre-defined size over at least the additional portion of the window including the additional masked pixel in the forward direction in the manner described above with respect to step 306. Depending upon where the additional pixel is in relation to the original pixel, the additional portion of the window may overlap with the portion of the window described above with respect to step 306. Next, the compressed media transmission program 150 may generate, by the GAN generator, the additional predicted pixel for the additional masked pixel based on the one or more additional surrounding pixels in the manner described above with respect to step 308. Depending upon where the additional pixel is in relation to the original pixel, the one or more additional surrounding pixels may be the same as at least one of the one or more surrounding pixels.

Then, the compressed media transmission program 150 may determine whether the discriminator of the GAN is able to identify the additional predicted pixel as real in the manner described above with respect to step 310. In response to determining the GAN is not able to identify the additional predicted pixel as real, the compressed media transmission program 150 may execute the backpropagation of the calculated loss in the manner described above with respect to step 312.

Next, in response to determining the discriminator of the GAN is able to identify the additional predicted pixel as real, the compressed media transmission program 150 may generate the additional reconstruction quality score for the additional pixel based on a similarity between the additional pixel and the additional predicted pixel in the manner described above with respect to step 314. For example, the additional reconstruction quality score for the additional pixel may be 0.81, which equals 81%. Then, the compressed media transmission program 150 assigns the additional CoS priority level to the additional pixel based on the additional reconstruction quality score in accordance with the CoS priority table. For example, where the additional pixel has an additional reconstruction quality score of 81%, the pixel may be assigned priority level CoS 5.

Next, at 318, the compressed media transmission program 150 assigns the pixel and each additional pixel to the one or more CoS priority groups. The classifier model described above with respect to step 314 may assign the pixel and each additional pixel to the one or more CoS priority groups based on the CoS priority level and the additional CoS priority level. The one or more CoS priority groups may be the pre-defined grouping described above with respect to step 206. For example, where the pixel is assigned priority level CoS 5 and an additional pixel is assigned priority level CoS 5, the pixel and the additional pixel may be assigned to group CoS 5.

Figure 4:
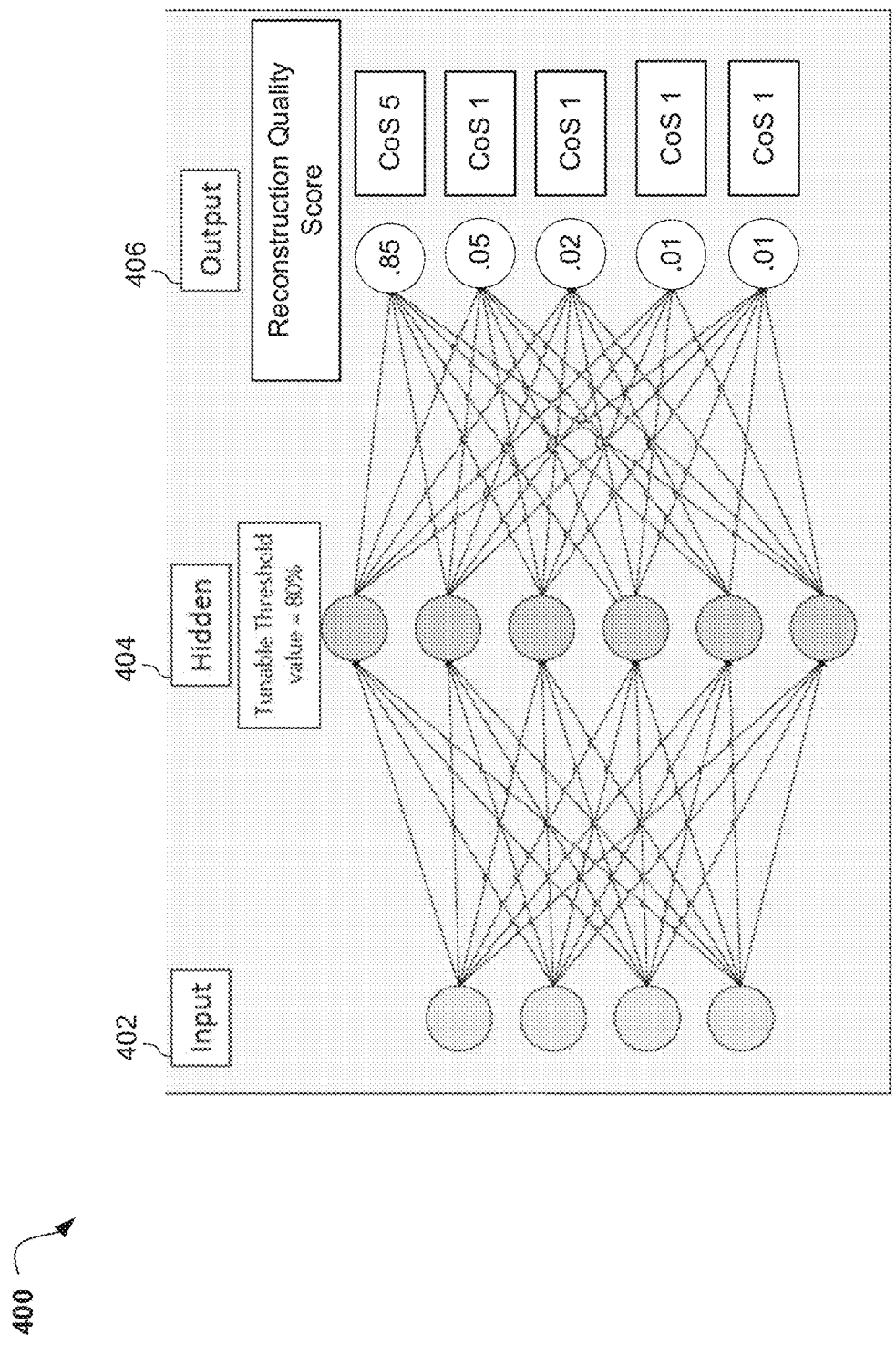
FIG. 4 is an exemplary diagram depicting pixels being assigned a Class of Service (CoS) priority level according to at least one embodiment.

Referring now to FIG. 4, an exemplary diagram 400 depicting pixels being assigned a CoS priority level is shown according to at least one embodiment. In the diagram 400, the input 402 may be the predicted pixel and each additional predicted pixel, together the plurality of pixels. The plurality of pixels may be fed to hidden layers 404 of the regressor model. The output 406 of the hidden layers 404 may include a plurality of reconstruction quality scores. For example, pixel 1 may have a reconstruction quality score of 0.85, pixel 2 may have a reconstruction quality score of 0.05, pixel 3 may have a reconstruction quality score of 0.02, pixel 4 may have a reconstruction quality score of 0.01, and pixel 5 may have a reconstruction quality score of 0.01. In this example, pixel 1 may be assigned priority level CoS 5, pixel 2 may be assigned priority level CoS 1, pixel 3 may be assigned priority level CoS 1, pixel 4 may be assigned priority level CoS 1, and pixel 5 may be assigned priority CoS 1. According to at least one embodiment, a tunable threshold value for compression may be 80%. In this embodiment, the pixels having a reconstruction quality score between 80% and 100% may be compressed.

Figure 5:
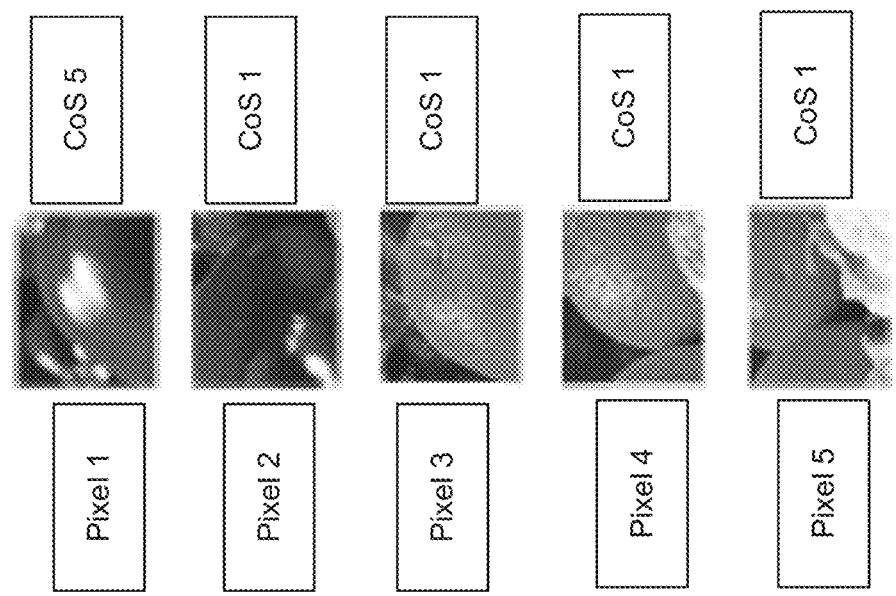
FIG. 5 is an exemplary diagram depicting the pixels in FIG. 4 being assigned to CoS priority groups according to at least one embodiment.

Referring now to FIG. 5, an exemplary diagram 500 depicting the pixels in FIG. 4 being assigned to CoS priority groups is shown according to at least one embodiment. In the diagram 500, pixel 1 may be assigned to group CoS 5. Pixel 2 may be assigned to group CoS 1. Pixel 3 may be assigned to group CoS 1. Pixel 4 may be assigned to group CoS 1. Additionally, pixel 5 may be assigned to group CoS 1.

It may be appreciated that FIGS. 2, 3A, 3B, 4, and 5 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of transmitting and regenerating compressed media, the method comprising:
   receiving an image selected by a sender to be transmitted to a recipient;
   sending the image to a pre-trained generative adversarial network (GAN) model;
   identifying a first set of one or more pixels in the image assigned to one or more high priority Class of Service (CoS) groups, wherein the one or more high priority CoS groups include a CoS group 1 and a CoS group 2, and a second set of one or more pixels in the image assigned to one or more low priority CoS groups, wherein the one or more low priority CoS groups include a CoS group 3, a CoS group 4, and a CoS group 5, based on a pre-defined grouping of the one or more pixels in the first set and the one or more pixels in the second set;

compressing, by the pre-trained GAN model, the one or more pixels in the second set; and transmitting the one or more pixels in the first set and the compressed one or more pixels in the second set to the recipient in an order from a highest priority CoS group to a lowest priority CoS group, wherein the order includes the CoS group 1 first, the CoS group 2 second, the CoS group 3 third, the CoS group 4 fourth, and the CoS group 5 fifth.

2. The computer-based method of claim 1, further comprising:

regenerating the image at a receiving end of the recipient by reconstructing the compressed one or more pixels in the second set.

3. The computer-based method of claim 1, further comprising a training phase, wherein the training phase comprises:

receiving an image having a window from a knowledge corpus;

masking a pixel in the window of the image;

sliding a kernel of a pre-defined size over at least a portion of the window including the masked pixel in a forward direction;

generating, by a GAN generator, a predicted pixel for the masked pixel based on one or more surrounding pixels;

determining whether a discriminator of the GAN is able to identify the predicted pixel as real; and in response to determining the discriminator is able to identify the predicted pixel as real:
generating a reconstruction quality score for the pixel based on a similarity between the pixel and the predicted pixel; and
assigning a CoS priority level to the pixel based on the reconstruction quality score in accordance with a CoS priority table.

4. The computer-based method of claim 3, wherein the training phase further comprises iterating, for each additional pixel in the window:

masking the additional pixel in the window of the image;

sliding the kernel of the pre-defined size over at least an additional portion of the window including the additional masked pixel in the forward direction;

generating, by the GAN generator, an additional predicted pixel for the additional masked pixel based on one or more additional surrounding pixels;

determining whether the discriminator of the GAN is able to identify the additional predicted pixel as real;

in response to determining the discriminator is able to identify the additional predicted pixel as real:
generating an additional reconstruction quality score for the additional pixel based on a similarity between the additional pixel and the additional predicted pixel; and
assigning an additional CoS priority level to the additional pixel based on the additional reconstruction quality score in accordance with the CoS priority table; and assigning the pixel and each additional pixel to one or more CoS priority groups based on the CoS priority level and the additional CoS priority level.

5. The computer-based method of claim 1, wherein the one or more pixels in the first set are transmitted before the compressed one or more pixels in the second set.

6. The computer-based method of claim 1, wherein the one or more pixels in the first set have a lower reconstruction quality score than the compressed one or more pixels in the second set.

7. The computer-based method of claim 1, wherein the reconstruction quality score of the compressed one or more pixels in the second set is between 41% and 100%.

8. A computer system, the computer system comprising:

a processor set;

one or more computer-readable storage media; and program instructions stored on the one or more computer-readable storage media to cause the processor set to perform operations comprising:

receiving an image selected by a sender to be transmitted to a recipient;

sending the image to a pre-trained generative adversarial network (GAN) model;

identifying a first set of one or more pixels in the image assigned to one or more high priority Class of Service (CoS) groups, wherein the one or more high priority CoS groups include a CoS group 1 and a CoS group 2, and a second set of one or more pixels in the image assigned to one or more low priority CoS groups, wherein the one or more low priority CoS groups include a CoS group 3, a CoS group 4, and a CoS group 5, based on a pre-defined grouping of the one or more pixels in the first set and the one or more pixels in the second set;

compressing, by the pre-trained GAN model, the one or more pixels in the second set; and transmitting the one or more pixels in the first set and the compressed one or more pixels in the second set to the recipient in an order from a highest priority CoS group to a lowest priority CoS group, wherein the order includes the CoS group 1 first, the CoS group 2 second, the CoS group 3 third, the CoS group 4 fourth, and the CoS group 5 fifth.

9. The computer system of claim 8, the method further comprising:

regenerating the image at a receiving end of the recipient by reconstructing the compressed one or more pixels in the second set.

10. The computer system of claim 8, the method further comprising a training phase, wherein the training phase comprises:

receiving an image having a window from a knowledge corpus;

masking a pixel in the window of the image;

sliding a kernel of a pre-defined size over at least a portion of the window including the masked pixel in a forward direction;

generating, by a GAN generator, a predicted pixel for the masked pixel based on one or more surrounding pixels;

determining whether a discriminator of the GAN is able to identify the predicted pixel as real; and in response to determining the discriminator is able to identify the predicted pixel as real:
generating a reconstruction quality score for the pixel based on a similarity between the pixel and the predicted pixel; and
assigning a CoS priority level to the pixel based on the reconstruction quality score in accordance with a CoS priority table.

11. The computer system of claim 10, wherein the training phase further comprises iterating, for each additional pixel in the window:
   masking the additional pixel in the window of the image;
   sliding the kernel of the pre-defined size over at least an additional portion of the window including the additional masked pixel in the forward direction;
   generating, by the GAN generator, an additional predicted pixel for the additional masked pixel based on one or more additional surrounding pixels;
   determining whether the discriminator of the GAN is able to identify the additional predicted pixel as real;
   in response to determining the discriminator is able to identify the additional predicted pixel as real:
      generating an additional reconstruction quality score for the additional pixel based on a similarity between the additional pixel and the additional predicted pixel; and
      assigning an additional CoS priority level to the additional pixel based on the additional reconstruction quality score in accordance with the CoS priority table; and
   assigning the pixel and each additional pixel to one or more CoS priority groups based on the CoS priority level and the additional CoS priority level.

12. The computer system of claim 8, wherein the one or more pixels in the first set are transmitted before the compressed one or more pixels in the second set.

13. The computer system of claim 8, wherein the one or more pixels in the first set have a lower reconstruction quality score than the compressed one or more pixels in the second set.

14. The computer system of claim 8, wherein the reconstruction quality score of the compressed one or more pixels in the second set is between 41% and 100%.

15. A computer program product, the computer program product comprising:
   one or more computer-readable storage media; and
   program instructions stored on the one or more computer-readable storage media to perform operations comprising:
      receiving an image selected by a sender to be transmitted to a recipient;
      sending the image to a pre-trained generative adversarial network (GAN) model;
      identifying a first set of one or more pixels in the image assigned to one or more high priority Class of Service (CoS) groups, wherein the one or more high priority CoS groups include a CoS group 1 and a CoS group 2, and a second set of one or more pixels in the image assigned to one or more low priority CoS groups, wherein the one or more low priority CoS groups include a CoS group 3, a CoS group 4, and a CoS group 5, based on a pre-defined grouping of the one or more pixels in the first set and the one or more pixels in the second set;
      compressing, by the pre-trained GAN model, the one or more pixels in the second set; and
      transmitting the one or more pixels in the first set and the compressed one or more pixels in the second set to the recipient in an order from a highest priority CoS group to a lowest priority CoS group, wherein the order includes the CoS group 1 first, the CoS group 2 second, the CoS group 3 third, the CoS group 4 fourth, and the CoS group 5 fifth.

16. The computer program product of claim 15, the method further comprising:
   regenerating the image at a receiving end of the recipient by reconstructing the compressed one or more pixels in the second set.

17. The computer program product of claim 15, the method further comprising a training phase, wherein the training phase comprises:
   receiving an image having a window from a knowledge corpus;
   masking a pixel in the window of the image;
   sliding a kernel of a pre-defined size over at least a portion of the window including the masked pixel in a forward direction;
   generating, by a GAN generator, a predicted pixel for the masked pixel based on one or more surrounding pixels;
   determining whether a discriminator of the GAN is able to identify the predicted pixel as real; and
   in response to determining the discriminator is able to identify the predicted pixel as real:
      generating a reconstruction quality score for the pixel based on a similarity between the pixel and the predicted pixel; and
      assigning a CoS priority level to the pixel based on the reconstruction quality score in accordance with a CoS priority table.

18. The computer program product of claim 17, wherein the training phase further comprises iterating, for each additional pixel in the window:
   masking the additional pixel in the window of the image;
   sliding the kernel of the pre-defined size over at least an additional portion of the window including the additional masked pixel in the forward direction;
   generating, by the GAN generator, an additional predicted pixel for the additional masked pixel based on one or more additional surrounding pixels;
   determining whether the discriminator of the GAN is able to identify the additional predicted pixel as real;
   in response to determining the discriminator is able to identify the additional predicted pixel as real:
      generating an additional reconstruction quality score for the additional pixel based on a similarity between the additional pixel and the additional predicted pixel; and
      assigning an additional CoS priority level to the additional pixel based on the additional reconstruction quality score in accordance with the CoS priority table; and
   assigning the pixel and each additional pixel to one or more CoS priority groups based on the CoS priority level and the additional CoS priority level.

19. The computer program product of claim 15, wherein the one or more pixels in the first set are transmitted before the compressed one or more pixels in the second set.

20. The computer program product of claim 15, wherein the one or more pixels in the first set have a lower reconstruction quality score than the compressed one or more pixels in the second set.

* * * * *